United States Patent
Kasahara et al.

(10) Patent No.: US 11,144,970 B2
(45) Date of Patent: Oct. 12, 2021

(54) INFORMATION PROCESSING DEVICE AND STORAGE MEDIUM

(71) Applicant: SiGNITY, Inc., Tokyo (JP)

(72) Inventors: Shun Kasahara, Tokyo (JP); Kyoichi Kawamoto, Tokyo (JP)

(73) Assignee: SiGNITY, Inc., Tokyo (JP)

( * ) Notice: Subject to any disclaimer, the term of this patent is extended or adjusted under 35 U.S.C. 154(b) by 0 days.

(21) Appl. No.: 17/033,213

(22) Filed: Sep. 25, 2020

(65) Prior Publication Data

US 2021/0012392 A1 Jan. 14, 2021

Related U.S. Application Data

(63) Continuation of application No. PCT/JP2020/006535, filed on Feb. 19, 2020.

(30) Foreign Application Priority Data

Mar. 7, 2019 (JP) .............................. JP2019-041119

(51) Int. Cl.
*G06Q 30/02* (2012.01)
*G06F 16/955* (2019.01)
(Continued)

(52) U.S. Cl.
CPC ....... *G06Q 30/0277* (2013.01); *G06F 16/955* (2019.01); *H04L 63/0876* (2013.01); *H04L 67/141* (2013.01); *H04L 67/146* (2013.01)

(58) Field of Classification Search
CPC . G06Q 30/0277; G06F 16/955; H04L 67/146; H04L 63/0876; H04L 67/141
See application file for complete search history.

(56) References Cited

U.S. PATENT DOCUMENTS

2003/0096625 A1 5/2003 Lee et al.
2009/0199107 A1* 8/2009 Lewis ................ G06Q 30/0269
715/745
(Continued)

FOREIGN PATENT DOCUMENTS

JP 2003-091679 A 3/2003
WO WO-2013082501 A * 6/2013 ............. H04L 51/10
WO 2017/175905 A1 10/2017

OTHER PUBLICATIONS

International Search Report issued in PCT/JP2020/006535 dated May 19, 2020 with English Translation (5 pages).

*Primary Examiner* — Joe Chacko
(74) *Attorney, Agent, or Firm* — Nakanishi IP Associates, LLC

(57) ABSTRACT

An information processing device performs: storing second advertisement information simpler than first advertisement information regarding an advertisement object, third advertisement information simpler than the first advertisement information and more detailed than the second advertisement information, permittee recognition information for allowing the user to recognize a permittee, a URL of a first webpage including a program for establishing a session with an information processing terminal together with content data, and a URL of a second webpage including the first advertisement information; transmitting the second advertisement information to the information processing terminal by push notification together with the permittee recognition information and the URL of the first webpage; and transmitting the third advertisement information together with the URL of the second webpage to the information processing terminal via the session with the information processing terminal established by executing the program on the information processing terminal that has downloaded the first webpage.

8 Claims, 8 Drawing Sheets

(51) Int. Cl.
*H04L 29/06* (2006.01)
*H04L 29/08* (2006.01)

(56) References Cited

U.S. PATENT DOCUMENTS

2017/0155728 A1* 6/2017 Lau .................. G06F 16/951
2018/0097764 A1* 4/2018 Lutsenko ............ G06F 3/0483
2019/0122265 A1  4/2019 Lee et al.

\* cited by examiner

NOTIFICATION DESTINATION INFORMATION MANAGEMENT TABLE

| UUID | REGISTRATION ID | SENDER ID | OS | DEVICE | BROWSER |
|------|-----------------|-----------|------|--------|---------|
| 0001 | Xa01 | abc01 | OS-X | D-X | B-X |
| | | | | | |
| | | | | | |
| | | | | | |

NOTIFICATION SOURCE INFORMATION
MANAGEMENT TABLE

| ACCOUNT ID | ACCOUNT NAME |
|---|---|
| 0001 | ABC COMPANY |
|  |  |
|  |  |
|  |  |

FIG.4

SITE INFORMATION MANAGEMENT TABLE

| SITE ID | SITE NAME | ACCOUNT ID | HTML TAG | ACCESS TOKEN | SENDER ID | SERVER KEY |
|---|---|---|---|---|---|---|
| 1001 | ABC SITE | 0001 | FIRST HTML TAG SECOND HTML TAG | abcaaods | abc01 | KEY(abc) |
|  |  |  |  |  |  |  |
|  |  |  |  |  |  |  |

FIG.5

HTML FILE OF PERMISSION RECEPTION PAGE

ADVERTISEMENT INFORMATION MANAGEMENT TABLE

| ADVERTISEMENT ID | SITE ID | ADVERTISEMENT TYPE | TEXT | IMAGE | CLICK URL |
|---|---|---|---|---|---|
| 3001 | 1001 | SIMPLE | ADVERTISEMENT SENTENCE A | IMAGE A | URL(A) |
| 3001 | 1001 | INTERMEDIATE | ADVERTISEMENT SENTENCE B | IMAGE B | URL(B) |
|  |  |  |  |  |  |
|  |  |  |  |  |  |

INFORMATION PROCESSING DEVICE AND STORAGE MEDIUM

CROSS-REFERENCE TO RELATED APPLICATIONS

This application is a continuation application of International Patent Application No. PCT/JP2020/006535 filed on Feb. 19, 2020, which is based upon and claims the benefit of priority from the prior Japanese Patent Application No. 2019-041119, filed Mar. 7, 2019 the entire contents of which are incorporated herein by reference.

FIELD

Embodiments described herein relate generally to an information processing device and a storage medium.

BACKGROUND

In recent years, the diffusion of portable information processing terminals such as smartphones and tablets has been rapidly increasing. Along with this, advertisements that have been conventionally distributed to users via TV and radio are becoming distributed to users' portable information processing terminals.

Advertisements for the portable information processing terminals include banner advertisements displayed in an advertisement frame on a webpage for a certain period of time, listing advertisements displayed with search results when a keyword is searched by a search engine, video advertisements posted on a video platform, and the like. Advertisers can use those advertisements to guide users who click the advertisements to their advertisement pages.

However, this type of advertisement is only seen by users who visit a specific webpage and has a large accidental factor, so it can be said that a rate of guide to a target advertisement page is low. On the other hand, direct mail or the like is distributed to users who are identified, so it can be expected to improve the rate of guide to the target advertisement page. However, because it is widely recognized now that there are spam emails containing computer viruses, a tendency to expand and browse emails from unfamiliar email addresses is low, so it cannot be said that improvement in the rate of guide to the target advertisement page is very high.

SUMMARY OF THE INVENTION

Technical Problem

An object is to improve a rate of guide to a target advertisement page.

Solution to Problem

An information processing device according to an embodiment is connected, via a public telecommunications network, to an information processing terminal of a user, a first server device that stores content data on a permittee (permitted person or permitted company) whose push notification the user has permitted receiving, and a second server device that stores first advertisement information on an advertisement object. The information processing device comprises: means for storing second advertisement information regarding the advertisement object and simpler than the first advertisement information, third advertisement information regarding the advertisement object and simpler than the first advertisement information and more detailed than the second advertisement information, permittee recognition information for allowing the user to recognize the permittee, a URL of a first webpage including a program for establishing a session with the information processing terminal together with the content data, and a URL of a second webpage including the first advertisement information; means for transmitting the second advertisement information to the information processing terminal by push notification together with the permittee recognition information and the URL of the first webpage; and means for transmitting the third advertisement information together with the URL of the second webpage to the information processing terminal via the session with the information processing terminal established by executing the program on the information processing terminal that has downloaded the first webpage.

BRIEF DESCRIPTION OF THE VIEWS OF THE DRAWING

FIG. 4 is a diagram showing an example of a notification source information management table stored in the storage device in FIG. 2;

FIG. 5 is a diagram showing an example of a site information management table stored in the storage device in FIG. 2;

DETAILED DESCRIPTION

An information processing device according to an embodiment is included in an advertisement distribution system together with a web server device and a push notification server device. An advertisement distribution service provided by the advertisement distribution system is a service that distributes advertisements with varying degrees of detail submitted by an advertiser in order from a simple advertisement, and eventually guides users to a target advertisement page where an advertisement object is posted. In the embodiment, the push notification server device is a different device from the information processing device according to the embodiment, but the information processing device according to the embodiment can have a function of the push notification server device.

In the advertisement distribution system, the information processing device distributes simple second advertisement information (also referred to as simple advertisement information) having a smaller amount of information than first advertisement information included in an advertisement page to a user's information processing terminal. The information processing device also distributes third advertisement information (also referred to as intermediate advertisement information) that is simple having a smaller amount of information than the first advertisement information and detailed having a larger amount of information than the second advertisement information to the information processing terminal of the user who has tapped a simple advertisement window displayed on the information processing terminal based on the second advertisement information. An intermediate advertisement window displayed on the information processing terminal based on the third advertisement information is linked to a URL of the advertisement page, and when the intermediate advertisement window is tapped, the advertisement page is displayed on the information processing terminal.

In the embodiment, to simplify description, it is assumed that the following three parties are involved in the advertisement distribution service according to the advertisement distribution system: an advertising agency (also referred to as an operator) that operates the advertisement distribution service; an advertiser (also referred to as a user) who uses the advertisement distribution service; and a providing company (also referred to as a provider) that provides the advertising agency with a notification list of push notification used in the advertisement distribution service.

Hereinafter, the information processing device according to the embodiment will be described with reference to the drawings.

Figure 1:
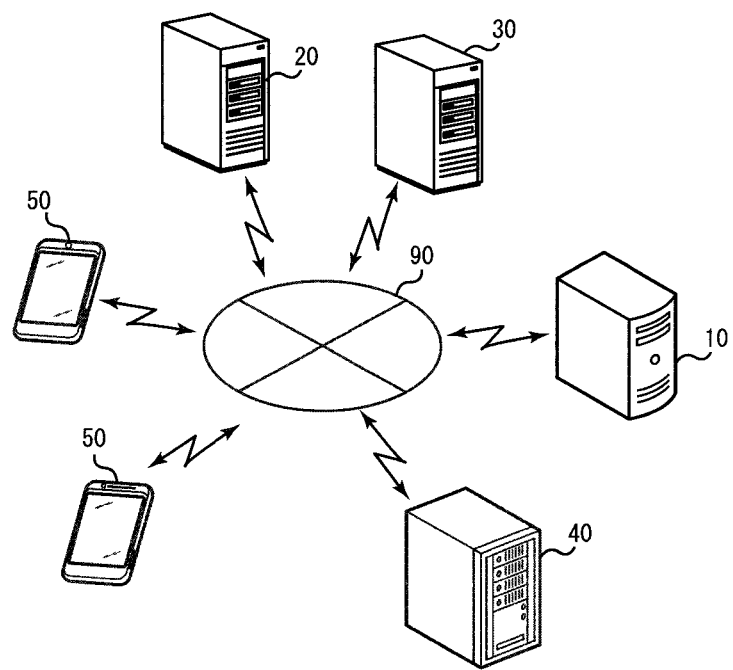
FIG. 1 is a diagram showing a configuration of an advertisement distribution system including an information processing device according to an embodiment.

As shown in FIG. 1, the advertisement distribution system includes an information processing device 10 managed by the advertising agency, a first server device 20 for managing an advertisement page of the advertiser, a second server device 30 for managing a website of the providing company, and a push notification server device 40 managed by a push notification agent. Users' information processing terminals 50 are connected in a mutually data transmission/reception available manner to the information processing device 10, the first server device 20, the second server device 30, and the push notification server device 40 via a network line (public telecommunications network) 90 such as the Internet.

The first server device 20 stores data on an HTML file corresponding to the advertisement page. The data on the HTML file includes content data and the like for forming the advertisement page. The first server device 20 makes an HTTP response to an HTTP request from a browser of the information processing terminal 50, and transmits data on an HTML file corresponding to a requested advertisement page to the browser of the information processing terminal 50. The browser of the information processing terminal 50 analyzes the data on the HTML file received from the first server device 20 and displays the advertisement page on a screen. Data, such as a CSS file and a JS file, necessary to form the advertisement page may be associated with the HTML file and sequentially transmitted to the information processing terminal 50.

The second server device 30 stores data on an HTML file corresponding to a website of the providing company. In the website of the providing company, a webpage in which a program (HTML tag) provided from the advertising agency described later is embedded is referred to as a permission reception page. The providing company that manages the permission reception page that has received permission of push notification reception from the user is also referred to as a permittee. The data on the HTML file includes content data and the like that form the permission reception page. The second server device 30 makes an HTTP response to an HTTP request from the browser of the information processing terminal 50, and transmits data on an HTML file corresponding to a requested permission reception page to the browser of the information processing terminal 50. The browser of the information processing terminal 50 analyzes the data on the HTML file received from the second server device 30 and displays the permission reception page on the screen. One feature is that the HTML file of the permission reception page includes not only the content data on the providing company but also a first program and a second program provided from the advertising agency. Details of the first program and the second program will be described later.

As described above, both of the first server device 20 and the second server device 30 function as web servers. In the embodiment, for convenience of description, the first server device 20 and the second server device 30 are distinguished from each other, but the first server device 20 and the second server device 30 may be formed by the same server device. In addition, data necessary to form the advertisement page and the permission reception page may be distributed in another external server device.

Figures 2, 3:
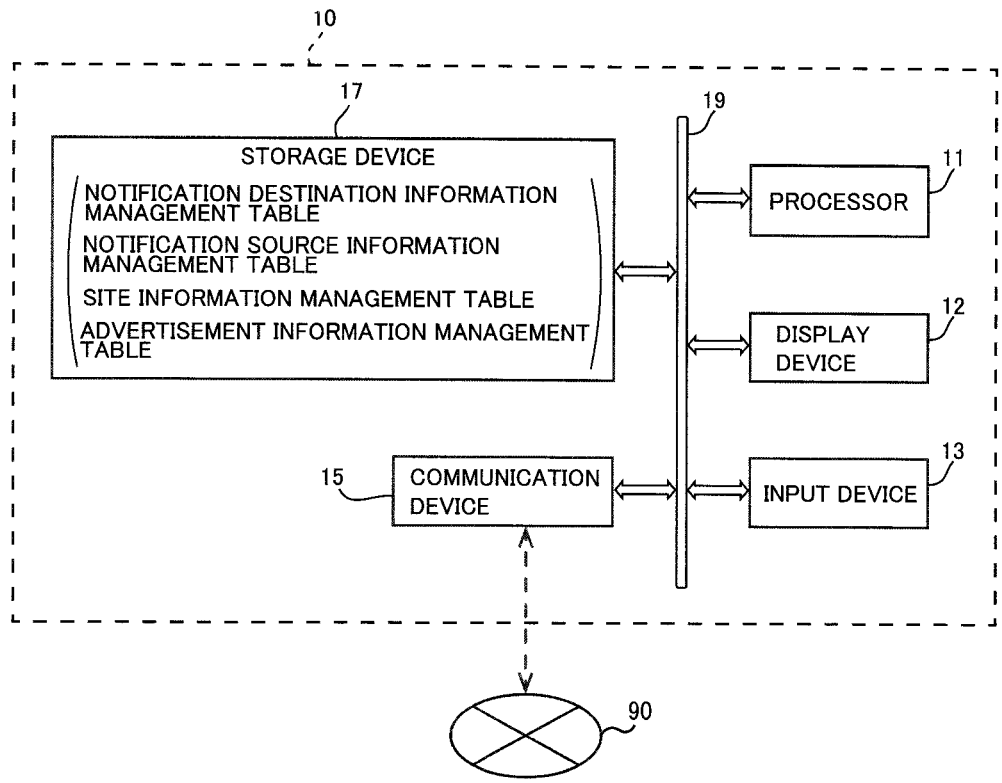
FIG. 2 is a configuration diagram of the information processing device according to the embodiment.
FIG. 3 is a diagram showing an example of a notification destination information management table stored in a storage device in FIG. 2.

As shown in FIG. 2, a processor 11 of the information processing device 10 is connected to a display device 12, an input device 13, a communication device 15, and a storage device 17 via a data and control bus 19. A server program related to the advertisement distribution service stored in the storage device 17 is executed by the processor 11, and thereby various functions related to a collection process of push notification destination information and an advertisement distribution process described later are implemented. The server program related to the advertisement distribution service may be downloaded onto the information processing device 10 via the Internet or may be stored in the storage device 17 of the information processing device 10 by reading a storage medium that has stored the server program related to the advertisement distribution service.

The storage device 17 stores a notification destination information management table for managing a push notification destination, a notification source information management table for managing account information on the providing company that manages the permission reception page of a push notification source, a site information management table for managing information on a website including the permission reception page, and an advertisement information management table for managing advertisement information submitted by the advertiser.

As shown in FIG. 3, in the notification destination information management table, the push notification destination information is managed by a UUID (Universally Unique Identifier) for uniquely identifying the push notification destination. Various types of information managed by the notification destination information management table is directly collected from the information processing terminal 50. The push notification destination information includes registration ID, sender ID, and browser information. The registration ID is ID for push notification, and is destination information for the push notification server device 40 to identify the push notification destination. The sender ID is information for the push notification server device 40 to identify the push notification source. The browser information is information for the information processing device 10 to identify the browser of the information processing terminal 50 of the user, for example, OS information for identifying a type of OS, device information for identifying a type of device, or information for identifying a type or version of browser.

As shown in FIG. 4, in the notification source information management table, an account name of the providing company is managed by account ID. Of course, a password or the like for logging into an advertisement distribution site for the providing company may be associated with the account ID.

As shown in FIG. 5, in the site information management table, site information including the permission reception page is managed by site ID. The site information includes site name, HTML tag, access token, sender ID, and server key. The access token is authentication information for the information processing device 10 to authenticate that the user is a user who has requested a later-described handshake to the information processing device 10 via the permission reception page. The server key is an authentication key for using a function of the push notification service provided by the push notification server device 40 at another site such as the advertisement distribution site. By holding the sender ID and the server key, the information processing device 10 can request push notification from the push notification server device 40 on behalf of the providing company.

Figures 6, 7:
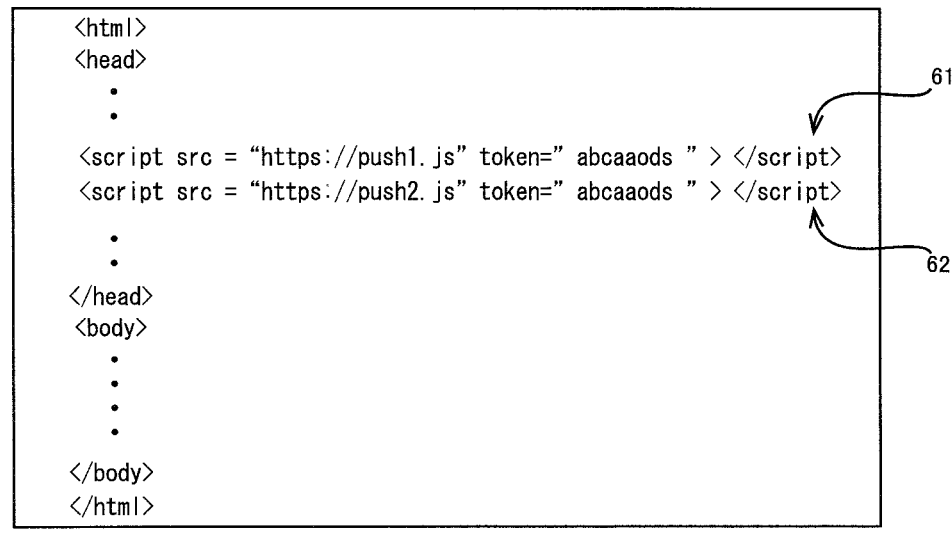
FIG. 6 is a diagram showing an example of an HTML file of a permission reception page in which HTML tags in FIG. 5 are embedded.
FIG. 7 is a diagram showing an example of an advertisement information management table stored in the storage device in FIG. 2.

Information managed by the notification source information management table and the site information management table is mainly registered by the providing company. A person in charge with the providing company uses a PC, a smartphone, or the like to log into the advertisement distribution site for the providing company managed by the advertising agency with the account name or the like, and registers the site name of a website including a webpage to be registered as the permission reception page, the sender ID, and the server key. When the information is registered by the providing company, the information processing device 10 issues an access token, and registers it in association with the information. The information processing device 10 issues a first HTML tag and a second HTML tag to be embedded in the webpage registered as the permission reception page. For example, the person in charge with the providing company copies the first HTML tag and the second HTML tag on the advertisement distribution site for the providing company, and pastes them on an HTML file on a specific page, for example, a top page of their registered site. Thereby, as shown in FIG. 6, first and second HTML tags 61 and 62 issued by the information processing device 10 are embedded in the HTML file of the webpage that will serve as the permission reception page. The first HTML tag 61 designates an external JavaScript® file which is the first program as a read destination, and describes an access token. The second HTML tag 62 designates an external JavaScript® file which is the second program as a read destination, and describes an access token.

The first program includes a function of displaying a push notification permission screen on a screen of the information processing terminal 50 of the user who has visited the permission reception page, a function of transmitting a push notification registration request to the push notification server device 40 when a permission button on the push notification permission screen is pressed, and a function of transmitting a push notification permission notification to the information processing device 10. The second program includes a function of transmitting a handshake request of Websocket to the information processing device 10.

If the above-described programs are executed on the information processing terminal 50 that has downloaded the HTML file of the permission reception page, for example, the first and second programs may be directly written in the HTML file.

As shown in FIG. 7, in the advertisement information management table, advertisement information is managed by advertisement ID. The advertisement information includes site ID, advertisement type, text, image, and click URL. The advertisement type distinguishes between the simple advertisement and the intermediate advertisement. The text and the image are content data actually displayed on the information processing terminal 50 of the user. The click URL is a URL of a link destination pasted on the simple advertisement or the intermediate advertisement. The advertisement information managed by the advertisement information management table is associated with the site information managed by the site information management table by the site ID. This enables identification of the push notification source of the simple advertisement information and authentication processing of the information processing terminal of a handshake request source of Websocket.

In advertisement information (simple advertisement information) whose advertisement type is "simple," information simpler than advertisement information included in a target advertisement page is registered. In advertisement information (intermediate advertisement information) whose advertisement type is "intermediate," information simpler than the advertisement information included in the target advertisement page and more detailed than the simple advertisement information is registered. "Simple" here means an amount of information is small and includes, for example, a display size displayed on the information processing terminal 50 being small, a volume of content data being limited, and link setting being limited. The volume of content data is limited by the number of texts, a size (volume) of image, the number of images, or the like. For example, the upper limit of the number of characters of an advertisement sentence A when the advertisement type is "simple" is limited to a number smaller than the upper limit of the number of characters of an advertisement sentence B when the advertisement type is "intermediate." Similarly, the upper limit of the size of an image A when the advertisement type is "simple" is limited to size smaller than the upper limit of the size of an image B when the advertisement type is "intermediate."

Advertisement information managed by the advertisement information management table is registered by the advertiser.

The advertiser logs into the advertisement distribution site of the advertiser managed by the advertising agency and sets up a new project for advertisement distribution. Thereby, advertisement ID for the simple advertisement whose advertisement type is "simple" and advertisement ID for the intermediate advertisement whose advertisement type is "intermediate" are issued.

The advertiser selects a site which will be a push notification source of the simple advertisement information from a plurality of sites. Thereby, the same site ID assigned to the selected site is associated with the advertisement ID for the simple advertisement and the advertisement ID for the intermediate advertisement. The selected site will become the push notification source, and the simple advertisement of the advertiser is transmitted by push notification to the user who has permitted reception of push notification from the site. Therefore, by selecting a site whose target meets a target customer layer of the advertisement page from the plurality of sites, the advertiser can effectively improve a rate of guide of the user to the advertisement page.

When a site is selected, the image A and a URL (A) are automatically registered. The image A is notification source recognition information (permittee recognition information) for causing the user to recognize the push notification source (providing company or website), and, for example, a logo of a site of the push notification source is set. A click URL (A) is a URL of a link destination when the simple advertisement information is tapped, and a URL of the permission reception page of the selected site is set. The advertiser registers the advertisement sentence A of the simple advertisement information, the advertisement sentence B of the intermediate advertisement information, the image B, and a URL (B). For the URL (B), the URL of the advertisement page of the advertiser is set. The notification source recognition information may be text information such as the URL of the permission reception page and a name of the site including the permission reception page, and a name of the providing company that is an operator of the site including the permission reception page. Of course, an image may be used as the advertisement information, and text may be used as the notification source recognition information. The above data may be included in the push notification as the notification source recognition information other than the image for the advertisement and the text for the advertisement. In any case, it suffices if information can be displayed by which the user can recognize the advertisement information of the advertiser and the push notification source on the simple advertisement window. Using the image rather than the text information as the notification source recognition information can cause the user who has seen the image to recognize the push notification source intuitively, and it can be expected to improve the reliability of push notification.

(Collection Process of Push Notification Destination Information)

Figure 8:
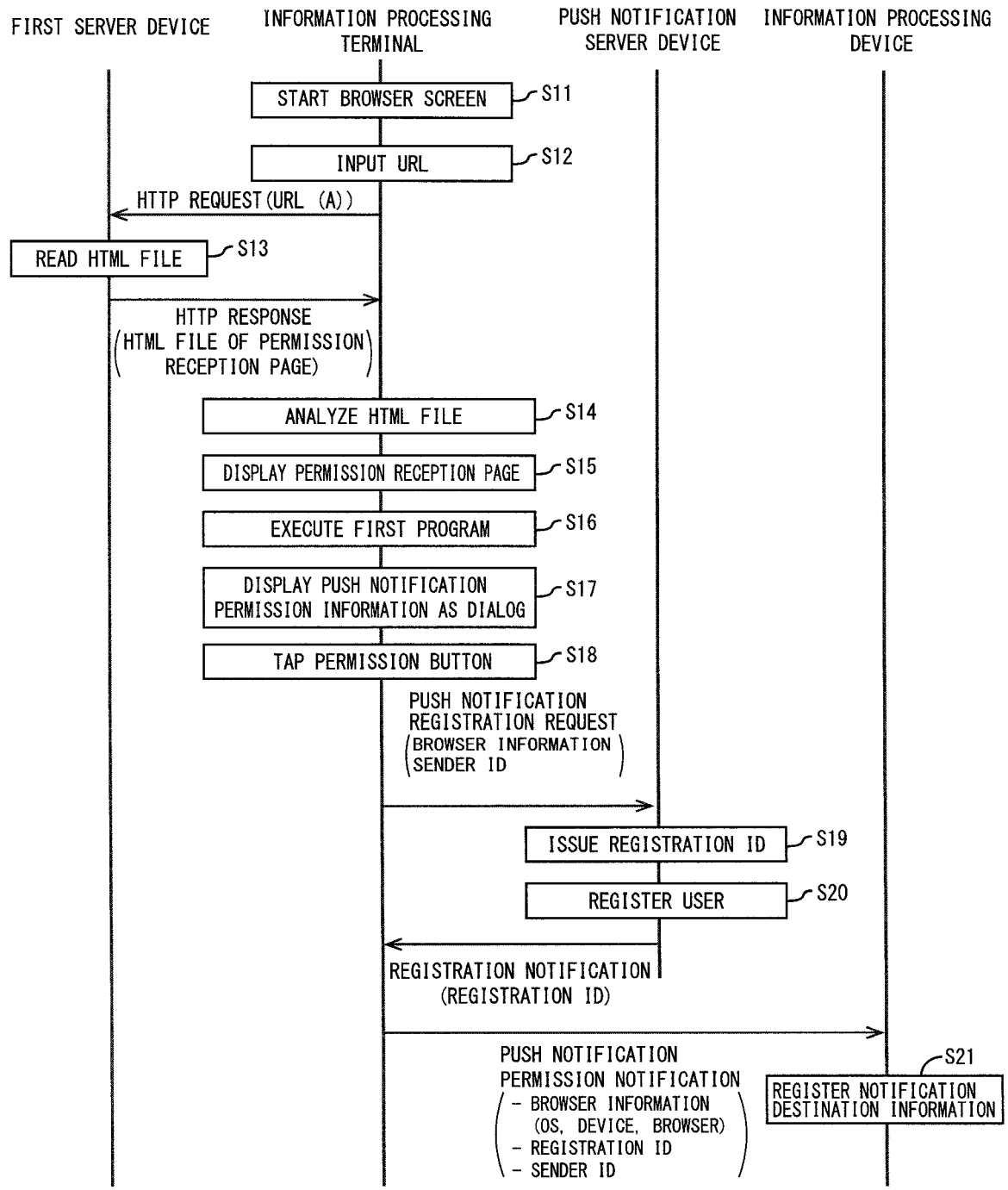
FIG. 8 is a sequence diagram showing an example of a collection process of push notification destination information by the advertisement distribution system in FIG. 1.

Hereinafter, a process of collecting browser information on a user who has visited the permission reception page of the providing company and permitted reception of push notification from the site including the permission reception page will be described with reference to FIGS. 8 and 9.

A browser screen is started on the information processing terminal 50 by a user operation (step S11), and the URL (A) of the permission reception page of the providing company is input on the browser screen (step S12). The browser of the information processing terminal 50 identifies the first server device 20 based on an IP address corresponding to the input URL, and requests an HTML file corresponding to the permission reception page. The first server device 20 reads data on the HTML file requested by the browser of the information processing terminal 50 from the storage unit (step S13), and transmits it to the information processing terminal 50. The browser of the information processing terminal 50 analyzes the data on the HTML file received from the first server device 20 (step S14), displays the permission reception page on the screen of the information processing terminal 50 (step S15), reads the first HTML tag 61 included in the HTML file of the permission reception page, and executes the first program downloaded from the external server device (step S16).

Figure 9:
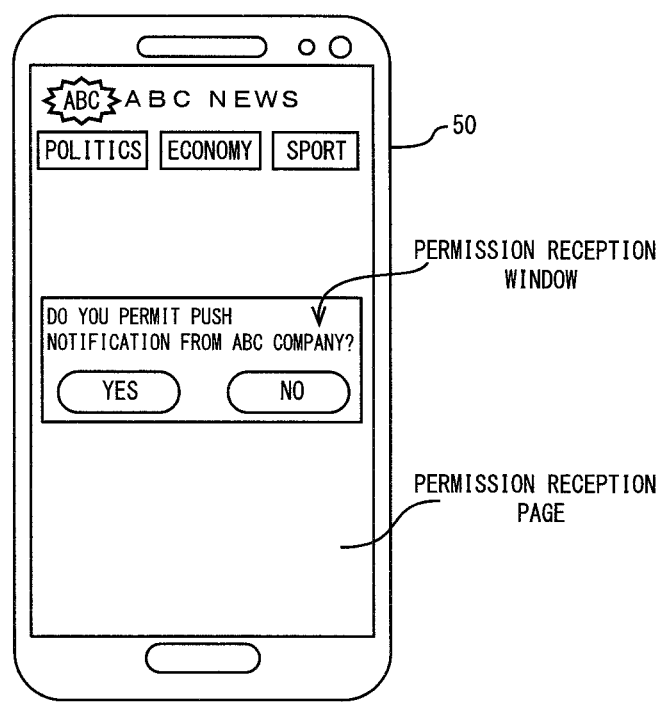
FIG. 9 is a diagram showing an example of a permission reception window displayed on a screen of an information processing terminal in FIG. 8.

According to the first program, the permission reception window for the user to determine whether to permit the reception of push notification from the site (actually the providing company that manages the site) including the permission reception page is displayed on the screen of the information processing terminal 50 (step S17) as shown in FIG. 9. When a "Yes" button (permission button) of the permission reception window is tapped (step S18), the browser of the information processing terminal 50 transmits, together with a push notification registration request, the browser information and the sender ID embedded in the above-described HTML file or the first program to the push notification server device 40. When receiving the push notification registration request, the push notification server device 40 issues registration ID (step S19), registers the issued registration ID in association with the sender ID and the browser information (step S20), and transmits it to the browser of the information processing terminal 50.

According to the first program, the browser of the information processing terminal 50 transmits, together with the push notification permission notification, the browser information of the information processing terminal 50, the registration ID received from the push notification server device 40, and the sender ID to the information processing device 10. The information processing device 10 associates and registers the registration ID, the sender ID, and the browser information received from the information processing terminal 50 with the notification destination information management table (step S21).

The collection process of the push notification destination information described above allows the information processing device 10 of the advertising agency to directly collect the browser information on the browser about which the reception of push notification from the site (actually the providing company) including the permission reception page of the providing company is permitted from the information processing terminal 50 of the user without going through the server device of the providing company. In this way, the providing company only embeds the first HTML tag provided by the advertising agency in the HTML file of the webpage in its own site, and can provide the browser information on the information processing terminal 50 of the user who has permitted the reception of push notification from its own site to the information processing device 10 of the advertising agency. The browser information on the browser about which the reception of push notification is permitted does not require to be managed by the providing company, and should be managed by only the advertising agency that substitutes transmission of push notification by the providing company. Since managers are simply reduced, it is possible to reduce a risk of browser information being leaked to a third party other than the providing company and the advertising agency. The providing company may be able to obtain price from the advertising agency by providing the advertising agency with the browser information about which the reception of push notification from its own site is permitted. In this way, the advertisement distribution service can provide a new business in which the providing company does not only use push notification from its own site for its own company but also lets a third party use push notification from the providing company.

(Advertisement Distribution Process)

Figure 10:
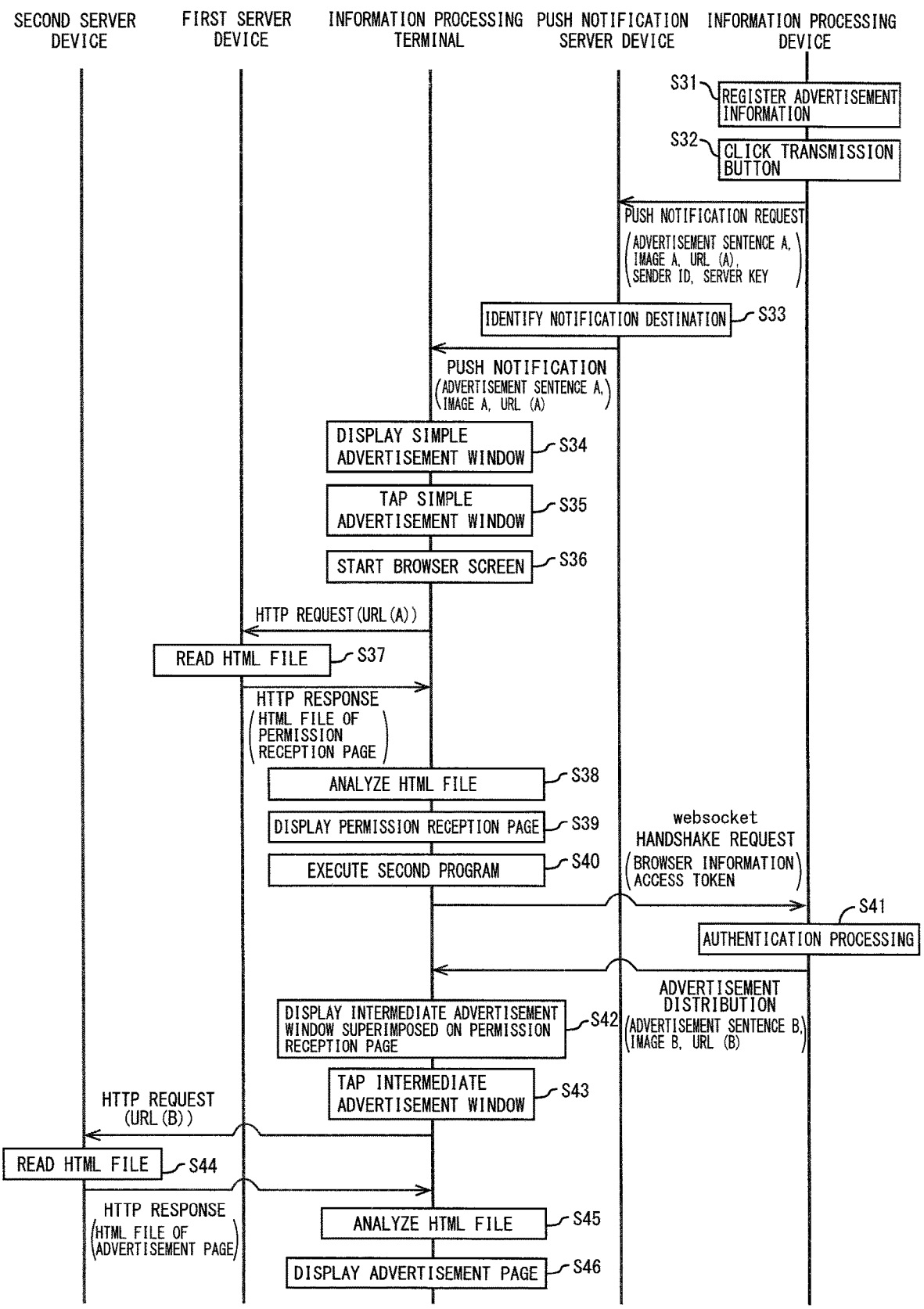
FIG. 10 is a sequence diagram showing an example of an advertisement distribution process by the advertisement distribution system in FIG. 1.
Figure 11:
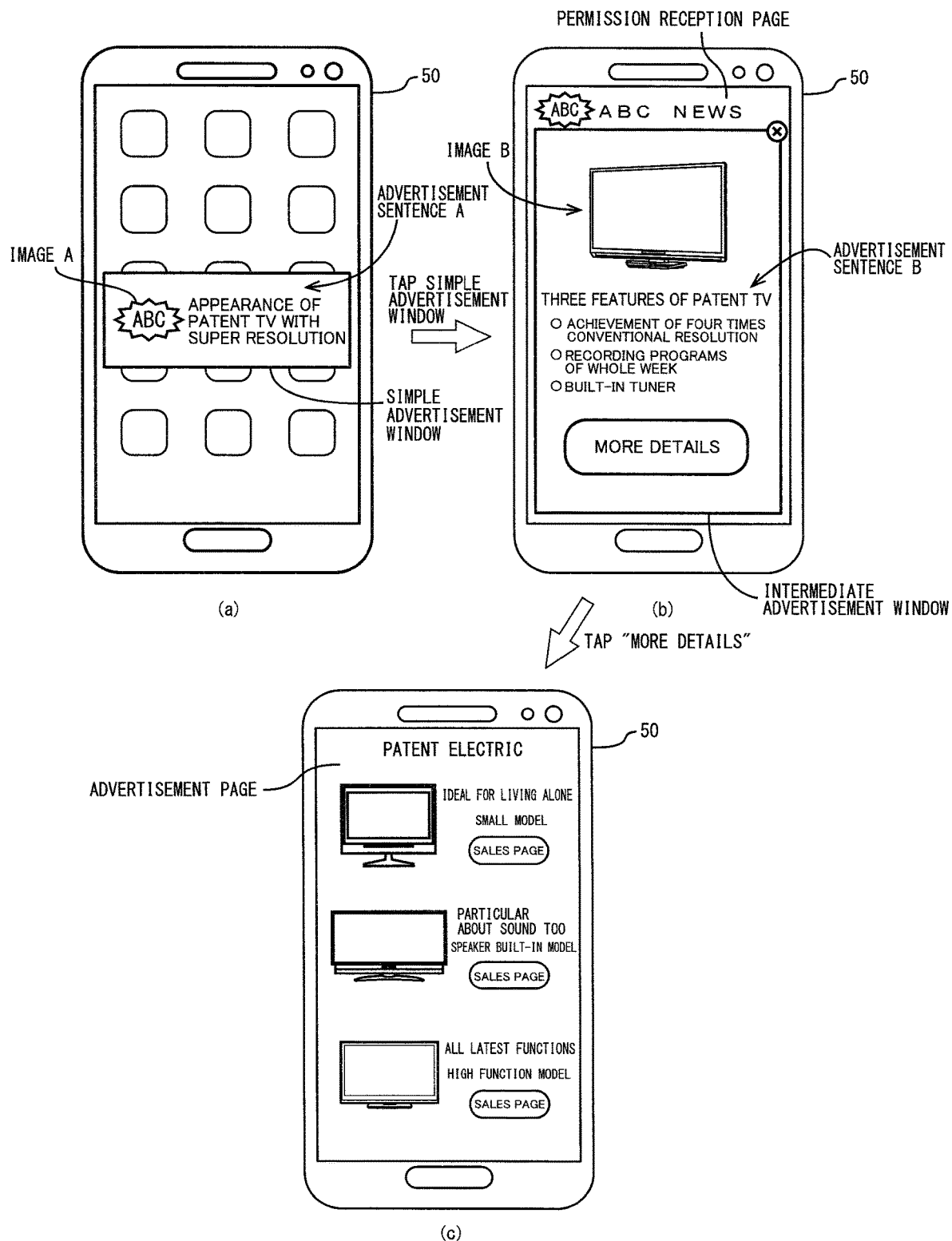
FIG. 11 is a diagram showing screen transition of the information processing terminal in the advertisement distribution process in FIG. 10.

Hereinafter, an advertisement distribution process will be described with reference to FIG. 10 and FIG. 11.

The advertiser uses the information processing device 10 such as a PC or a smartphone to log into the advertisement distribution site for the advertiser, register advertisement information (step S31), and click a transmission button (step S32). Of course, instead of the advertiser clicking the transmission button on the advertisement distribution site, a distribution timing may be registered in advance by the advertiser.

When the transmission button of push notification is clicked, the information processing device 10 transmits the simple advertisement information together with the sender ID and the server key to the push notification server device 40. The push notification server device 40 performs authentication processing on the site of the providing company by the sender ID and the server key, and identifies the push notification destination where the reception of push notification from the site is permitted based on the sender ID (step S33). The push notification server device 40 transmits the simple advertisement information to the browser of the identified push notification destination by push notification. The browser of the information processing terminal 50 displays the simple advertisement window on the screen based on the simple advertisement information (step S34). Typically, the simple advertisement window is displayed in a smaller size than the intermediate advertisement window described later. For example, as shown in FIG. 11, the simple advertisement window is displayed as a dialog on a home screen of the information processing terminal 50. The simple advertisement window includes the advertisement sentence A regarding the advertisement object and the image A as the notification source recognition information for causing the user to recognize the push notification source, and has the link to the URL (A) set. Note that the display form of the simple advertisement window is not limited to the dialog form, and as long as the simple advertisement window is disposed at a part of the screen of the information processing terminal 50, its position, size, and shape are arbitrary.

As described above, transmitting the simple advertisement information of the advertiser to the information processing terminal 50 of the user by using push notification is one of features of the advertisement distribution service. This allows the simple advertisement information to be displayed on the home screen or a lock screen of the information processing terminal 50 of the user, and reliably allows the user to recognize the simple advertisement information. Note that in the embodiment, the push notification destination is the browser of the information processing terminal 50, but it may be another application.

That the push notification source is not the advertiser but the providing company is also one of the features of the advertisement distribution service. Thereby, the advertiser neither needs to use the push notification service, nor needs to prepare the notification destination list of push notification. By simply using the advertisement distribution service, the advertiser can distribute the simple advertisement information to the browser of the information processing terminal 50 of a target customer who is eventually guided to the advertisement page by using push notification.

One of the features of the advertisement distribution service is that the notification source recognition information that allows the user to recognize the push notification source is distributed to the browser of the information processing terminal 50 of the user and displayed together with the simple advertisement information of the advertiser. The user has only permitted the reception of push notification from the site including the permission reception page, but has not permitted the reception of push notification from the advertiser. If the notification source recognition information is not displayed, it is likely that the user will feel distrust of the advertisement information whose push notification source is unknown from an unfamiliar advertiser. Even if users are interested in the advertisement object, there will be few users who want to obtain more detailed advertisement information by tapping the simple advertisement window whose source is unknown.

However, the reliability of the user for push notification can be improved by displaying the simple advertisement information together with the notification source recognition information. Specifically, the notification source recognition information allows the user to recognize that the push notification has been duly received from the site permitted by the user. This can suggest to the user that the simple advertisement information displayed by push notification is advertisement information related to the push notification source, and is advertisement information at least permitted by the push notification source. Since the user can view the simple advertisement window with peace of mind, the user who is interested in the advertisement object is likely to tap the simple advertisement window. Improving the possibility that the simple advertisement window will be tapped can increase the number of users who are eventually guided to the advertisement page and the rate of guide of the users.

When the simple advertisement window is tapped (step S35), the browser of the information processing terminal 50 starts the browser screen (step S36), identifies the first server device 20 by an IP address corresponding to the URL (A), and requests an HTML file corresponding to the URL (A). The first server device 20 reads data on the HTML file requested by the browser of the information processing terminal 50 from the storage unit (step S37), and transmits it to the browser of the information processing terminal 50. The browser of the information processing terminal 50 analyzes data on the HTML file received from the first server device 20 (step S38), displays the permission reception page on the browser screen (step S39), reads an HTML tag included in the HTML file of the permission reception page, and executes the second program downloaded from the external server device (step S40).

According to the second program, the browser transmits the browser information and an access token to the information processing device 10 together with a Websocket handshake request. The information processing device 10 authenticates the browser based on the browser information and the access token received from the browser of the information processing terminal 50, and establishes a session in accordance with the Websocket standard (step S41). By the authentication process of step S41, the information processing device 10 can confirm that the request is a handshake request from the information processing terminal of the user who has tapped the simple advertisement window, and can prevent advertisement distribution to an information processing terminal that has accessed improperly. The information processing device 10 transmits the intermediate advertisement information to the browser of the information processing terminal 50 via the established session.

As described above, transmitting the intermediate advertisement information to the information processing terminal 50 via the session in accordance with the Websocket standard is one of the features of the advertisement distribution service. Use of Websocket enables bidirectional communication, in particular, full duplex communication. That is, the information processing device 10 can perform data transmission to the information processing terminal 50 with a high degree of freedom via the session in accordance with the Websocket standard. Specifically, the information processing device 10 can transmit rich content data such as a still image or a moving image to the browser of the information processing terminal 50 at any timing without requiring a request from the information processing terminal 50. Since the request from the information processing terminal 50 can be made unnecessary, the information processing terminal 50 does not need to keep making inquiries to the information processing device 10 at regular intervals as in the case of using the HTTP standard, so processing resources and power consumption of the information processing terminal 50 can be reduced. Since there is no need to wait for a request from the information processing terminal 50, high-speed distribution is possible. The above does not deny use of communication standards, such as HTTP and WebRTC, other than Websocket, and sessions in accordance with those standards can be established with the information processing terminal 50.

The browser of the information processing terminal 50 displays the intermediate advertisement window on the permission reception page already displayed on the screen of the information processing terminal 50 based on the intermediate advertisement information received from the information processing device 10 (step S42). The intermediate advertisement window is displayed in a smaller size than the permission reception page so that the user can recognize the permission reception page even in a state in which the intermediate advertisement window is superimposed on the permission reception page. As shown in FIG. 11, the intermediate advertisement window is displayed in a size smaller than the permission reception page and larger than the simple advertisement window. The intermediate advertisement window includes the advertisement sentence B and the image B regarding the advertisement object, and has a link set to the URL (B) of the advertisement page. As long as the user can recognize the permission reception page, the display, size, and shape of the displayed intermediate advertisement window are not limited to the above. For example, the intermediate advertisement window may be displayed in full screen in a state of a transparent background or may be displayed side by side with the permission reception page.

As described above, one of the features of the advertisement distribution service is to display the intermediate advertisement window so that the user can recognize the permission reception page. This feature exerts the same effect as displaying the simple advertisement information together with the notification source recognition information for causing the user to recognize the push notification source in the simple advertisement window. That is, the user does not completely trust the advertisement information even if the user has tapped the simple advertisement window. However, it is possible to suggest to the user that the intermediate advertisement information is at least permitted by the push notification source by displaying the intermediate advertisement window such that the user can recognize the permission reception page familiar to the user who has permitted push notification. Thereby, it is possible to improve the reliability of the user for the intermediate advertisement information. Improving the reliability of the user for the intermediate advertisement information increases the number of users who are guided to the advertisement page, and thereby improves the rate of guide of the users.

When the intermediate advertisement window is tapped (step S43), the browser of the information processing terminal 50 identifies the second server device 30 by an IP address corresponding to the URL (B), and requests an HTML file corresponding to the URL (B). The second server device 30 reads data on the HTML file requested by the browser of the information processing terminal 50 from the storage unit (step S44), and transmits it to the browser of the information processing terminal 50. The browser of the information processing terminal 50 analyzes the data on the HTML file received from the second server device 30 (step S45), and displays an advertisement page on the screen of the information processing terminal 50 (step S46). The user can be effectively guided to the target advertisement page by the advertisement distribution process by the advertisement distribution system described above.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processing device connected, via a public telecommunications network, to an information processing terminal of a user, a first server device that stores content data on a permittee whose push notification the user has permitted receiving, and a second server device that stores first advertisement information on an advertisement object, the information processing device comprising:
   a storage that stores second advertisement information regarding the advertisement object provided by an advertiser who is different from the permittee and simpler than the first advertisement information, third advertisement information regarding the advertisement object and simpler than the first advertisement information and more detailed than the second advertisement information, permittee recognition information for allowing the user to recognize the permittee, a URL of a first webpage including a program for establishing a session between the information processing terminal and the information processing device together with the content data, and a URL of a second webpage including the first advertisement information;
   a transmitter that transmits the second advertisement information to the information processing terminal by push notification together with the permittee recognition information and the URL of the first webpage; and
   a transmitter that, in response to opening of the push notification, transmits the third advertisement information together with the URL of the second webpage to the information processing terminal via the session established between the information processing terminal and the information processing device by executing the program on the information processing terminal that has downloaded the first webpage from the first server device,
   wherein:
   the permittee recognition information is transmitted with the second advertisement information to the information processing terminal, so as to make the user recognize that the push notification has been sent by the permittee;
   the first webpage is transmitted with the third advertisement information to the information processing terminal, so as to make the user recognize that the third advertisement information has been sent by the permittee;
   in response to opening of a predetermined area in the push notification, the second server device is downloaded from the second server device to the information processing terminal and the second webpage including the first advertisement is displayed on the information processing terminal;

the storage stores information about a plurality of permittees;

the information processing device identifies a permittee selected from the plurality of permittees by the advertiser; and the permittee recognition information is associated with the permittee selected by the advertiser.

2. The information processing device according to claim 1, further comprising a transmitter that transmits the program to a server device of the permittee in order to include the program in the first webpage.

3. The information processing device according to claim 1, wherein the third advertisement information is transmitted in a display size smaller than the first webpage.

4. The information processing device according to claim 1, further comprising authentication unit including a processor, the authentication unit authenticating the information processing terminal based on terminal information on the information processing terminal and authentication information included in the program, wherein the session is established between the authenticated information processing terminal and the information processing device.

5. The information processing device according to claim 1, wherein the session is established using Websocket.

6. The information processing device according to claim 1, wherein the permittee recognition information is image data, and the second advertisement information is text data.

7. The information processing device according to claim 1, further comprising a storage that stores push notification ID of the information processing terminal and push notification ID of a plurality of other information processing terminals in association with information for identifying the permittee and information for identifying a plurality of other permittees.

8. The information processing device according to claim 1, further comprising:

a transmitter that transmits another program to a server device of the permittee in order to include, in the first webpage, the other program that, when reception of the push notification is permitted in the information processing terminal, causes the information processing device to directly transmit push notification ID issued to the information processing terminal and permittee identification information for identifying the permittee whose push notification is permitted to be received; and a storage that stores the push notification ID transmitted from the information processing terminal by executing the other program on the information processing terminal that has downloaded the first webpage in association with the permittee identification information.

* * * * *